US008908995B2

(12) United States Patent
Benos et al.

(10) Patent No.: US 8,908,995 B2
(45) Date of Patent: Dec. 9, 2014

(54) SEMI-AUTOMATIC DIMENSIONING WITH IMAGER ON A PORTABLE DEVICE

(75) Inventors: Virginie Benos, Dremi Lafage (FR); Vincent Bessettes, Toulouse (FR); Franck Laffargue, Toulouse (FR)

(73) Assignee: Intermec IP Corp., Everett, WA (US)

( * ) Notice: Subject to any disclaimer, the term of this patent is extended or adjusted under 35 U.S.C. 154(b) by 1280 days.

(21) Appl. No.: 12/685,816

(22) Filed: Jan. 12, 2010

(65) Prior Publication Data

US 2010/0202702 A1 Aug. 12, 2010

Related U.S. Application Data

(60) Provisional application No. 61/149,912, filed on Feb. 4, 2009.

(30) Foreign Application Priority Data

Jan. 12, 2009 (EP) .................................... 09368001

(51) Int. Cl.
*G06K 9/48* (2006.01)
*G06T 7/60* (2006.01)

(52) U.S. Cl.
CPC ......... *G06T 7/602* (2013.01); *G06T 2207/1004* (2013.01)
USPC ........... 382/286; 345/427; 356/620; 382/101; 382/114; 382/154; 382/293; 715/209; 715/255; 715/825; 715/839

(58) Field of Classification Search
None
See application file for complete search history.

(56) References Cited

U.S. PATENT DOCUMENTS

| 5,548,707 | A | * | 8/1996 | LoNegro et al. | 715/255 |
| 5,655,095 | A | * | 8/1997 | LoNegro et al. | 715/825 |
| 5,729,750 | A | * | 3/1998 | Ishida | 715/209 |
| 5,929,856 | A | * | 7/1999 | LoNegro et al. | 715/839 |
| 7,085,409 | B2 | * | 8/2006 | Sawhney et al. | 382/154 |
| 7,788,883 | B2 | * | 9/2010 | Buckley et al. | 53/456 |
| 8,028,501 | B2 | * | 10/2011 | Buckley et al. | 53/456 |
| 8,102,395 | B2 | * | 1/2012 | Kondo et al. | 345/427 |
| 2002/0118874 | A1 | * | 8/2002 | Chung et al. | 382/154 |
| 2003/0091227 | A1 | * | 5/2003 | Chang et al. | 382/154 |
| 2004/0233461 | A1 | * | 11/2004 | Armstrong et al. | 356/620 |
| 2006/0159307 | A1 | * | 7/2006 | Anderson et al. | 382/101 |
| 2006/0269165 | A1 | * | 11/2006 | Viswanathan | 382/293 |
| 2008/0013793 | A1 | * | 1/2008 | Hillis et al. | 382/114 |
| 2009/0313948 | A1 | * | 12/2009 | Buckley et al. | 53/456 |

OTHER PUBLICATIONS

Benos et al., "Semi-Automatic Dimensioning with Imager on a Portable Device," U.S. Appl. 61/149,912, filed Feb. 4, 2009.

(Continued)

*Primary Examiner* — Tsung-Yin Tsai
(74) *Attorney, Agent, or Firm* — Additon, Higgins & Pendleton, P.A.

(57) ABSTRACT

A method of operating a dimensioning system to determine dimensional information for objects is disclosed. A number of images are acquired. Objects in at least one of the acquired images are computationally identified. One object represented in the at least one of the acquired images is computationally initially selected as a candidate for processing. An indication of the initially selected object is provided to a user. At least one user input indicative of an object selected for processing is received. Dimensional data for the object indicated by the received user input is computationally determined.

17 Claims, 11 Drawing Sheets

(56) References Cited

OTHER PUBLICATIONS

Dimensional Weight—Wikipedia, the Free Encyclopedia, URL=http://en.wikipedia.org/wiki/Dimensional_weight, download date Aug. 1, 2008, 2 pages.

Dimensioning—Wikipedia, the Free Encyclopedia, URL=http://en.wikipedia.org/wiki/Dimensioning, download date Aug. 1, 2008, 1 page.

\* cited by examiner

SEMI-AUTOMATIC DIMENSIONING WITH IMAGER ON A PORTABLE DEVICE

CROSS REFERENCE TO RELATED APPLICATIONS

This application claims benefit under 35 U.S.C. 119(e) of U.S. Provisional Patent Application Ser. No. 61/149,912, filed Feb. 4, 2009 and entitled "SEMI-AUTOMATIC DIMENSIONING WITH IMAGER ON A PORTABLE DEVICE," which is incorporated herein by reference in its entirety.

BACKGROUND

1. Technical Field

This disclosure generally relates to the field of automated package handling.

2. Description of the Related Art

Package handling efficiency is increased by automating aspect of the process. Two processes that are time consuming are the determination of the package dimensions and/or determining dimensional weight. Package dimensions are important to optimize the loading process. In addition, knowing the remaining space is also useful.

The concept of dimensional weight has commonly been adopted by the transportation industry in most parts of the world as a standard way of determining charges for the shipment of packaged goods. Determining the dimensional weight of an object involves measuring the cubic space occupied by the object, or dimensioning. Dimensional weight is widely used because shipping costs calculated based on weight of the goods alone would render it unprofitable for carriers when the shipped goods have low density, e.g., small weight but occupying a large space. By using dimensional weight in calculating shipping costs, on the other hand, carriers can charge based on either the actual weight or the dimensional weight of the shipped goods, usually depending on whichever is greater. Moreover, by dimensioning objects, such as parcels, packages, and pallets, carriers, warehouses, shipping retailers, postal companies, or the like may optimally utilize their storage space and charge for the service accordingly.

Dimensional weight involves the volumetric weight of an object, and, more specifically, the cubic space the object occupies. Typically, the dimensional weight of an object is calculated as the multiplicative product of the object's length, width, and height divided by a constant. For example, in the United States, the dimensional weight of an object is calculated by domestic air carriers as (length×width×height)/166, with all dimensions in inches. A parcel weighing 25 pounds and having volumetric dimensions of 20×15×15 inches would have, using the above formula, a dimensional weight of 27.1 pounds. In this example, the shipping charge would be determined based on the dimensional weight of 27.1 pounds, because it is greater than the actual weight of 25 pounds.

To expedite the dimensioning process and to facilitate accurate dimensioning, companies have invested in various automatic dimensioning systems. One type of dimensioning system, such as a volume dimensioning application, performs volumetric dimensioning of objects by first capturing an image of the objects and then finding those objects in the image. For instance, an image capturing device may be utilized to capture an image of a number of parcels waiting to be dimensioned. Afterwards, a computing device may select one of the parcels from the parcels in the image to calculate the dimensional weight for. To do so, the computing device may need to estimate the boundary of the selected parcel to determine its approximate length, width, and height for the calculation. However, it can be very difficult at times to discern a particular object or objects in an image due to insufficient lighting or the presence of numerous objects in the same image. Although such a volume dimensioning application may be designed as a standalone, automatic application, issues such as those mentioned above may cause inaccuracy in the dimensioning process and ultimately result in delay and extra operational costs.

BRIEF SUMMARY

A method of operating a dimensioning system to determine dimensional information for objects may be summarized as including acquiring a number of images; computationally identifying objects in at least one of the acquired images; computationally initially selecting one object represented in the at least one of the acquired images as a candidate for processing; providing an indication to a user indicative of the initially selected object; receiving at least one user input indicative of an object selected for processing; and computationally determining dimensional data for the object indicated by the received user input.

Receiving at least one user input indicative of an object selected for processing may include receiving a user selection that confirms the initially selected one object as the object for processing. Computationally determining dimensional data for the object indicated by the received user input may include determining a dimensional weight based on an estimated perimeter of the initially selected one object as represented in the acquired image. Receiving at least one user input indicative of an object selected for processing may include receiving a user selection that indicates an object other than the initially selected one object as the object for processing. Computationally determining dimensional data for the object indicated by the received user input may include determining a dimensional weight based on an estimated perimeter of the object indicated by the received user selection as the object is represented in the acquired image. The method may further include providing an indication to the user indicative of a currently selected object, the indication visually distinguishing the currently selected object in a display of the acquired image from any other object represented in the display of the acquired image. Receiving at least one user input indicative of an object selected for processing may include receiving a user selection that indicates at least a portion of a new perimeter for the object for processing. Computationally determining dimensional data for the object indicated by the received user input may include computationally determining dimensional data based on the new perimeter of the object represented in the acquired image. Providing an indication to a user indicative of the initially selected object may include displaying the acquired image and visually distinguishing the initially selected object in the display of the acquired image from any other objects represented in the display of the acquired image. Visually distinguishing the initially selected object in the display of the acquired image from any other objects represented in the display of the acquired image may include displaying a border about at least a portion of the initially selected object in the display of the acquired image. Receiving at least one user input indicative of an object selected for processing may include receiving at least one signal representing a position in the image that indicates a position of at least a portion of a new perimeter for the object for processing. Visually distinguishing the initially selected object in the display of the acquired image from any other objects represented in the display of the acquired image may include displaying a draggable border about at least a portion of the initially selected object in the display of the acquired image. Receiving at least one user input indicative of an object selected for processing may include receiving at least one signal representing a dragging of the draggable border to a new position that indicates at least a portion of a new perimeter for the object for processing. Computationally determining dimensional data for the object indicated by the received user input may include computationally determining a dimension of at least one of a box, a package, a parcel, a pallet or a document represented in the acquired image.

A method of operating a dimensioning system to determine dimensional information for objects may be summarized as including acquiring a number of images; computationally identifying objects or spaces in at least one of the acquired images; determining dimensional data for at least one object or space; and receiving at least one user input indicative of an object or space selected for processing.

The method may further include computationally determining dimensional data for the object or space selected by the received user input. The method may further include computationally revising the determined dimensional data for the at least one object or space in response to the received user input. Receiving at least one user input may include receiving at least one user input in the form of at least one of a keyboard entry, a computer mouse entry, a touch-screen device entry, a voice command, an audible command, and a bar code reading. Receiving at least one user input indicative of an object or space selected for processing may include receiving a user selection that confirms the initially selected one object or space as the object for processing. Computationally determining dimensional data for the object or space selected by the received user input may include determining a dimensional weight based on an estimated perimeter of the initially selected one object as represented in the acquired image. Computationally determining dimensional data for the object or space selected by the received user input may include determining a dimensional data based on an estimated perimeter of the initially selected one space as represented in the acquired image. Receiving at least one user input indicative of an object or space selected for processing may include receiving a user selection that indicates an object or space other than the initially selected one object or space as the object or space for processing. Computationally determining dimensional data for the object or space selected by the received user input may include determining a dimensional weight based on an estimated perimeter of the object selected by the received user selection as the object is represented in the acquired image. Computationally determining dimensional data for the object or space selected by the received user input may include determining a dimensional data based on an estimated perimeter of the space selected by the received user selection as the space is represented in the acquired image. The method may further include providing an indication to the user indicative of a currently selected object or space, the indication visually distinguishing the currently selected object or space in a display of the acquired image from any other object or space represented in the display of the acquired image. Receiving at least one user input indicative of an object or space selected for processing may include receiving a user selection that indicates at least a portion of a new perimeter for the object or space for processing. Computationally determining dimensional data for the object or space selected by the received user input may include computationally determining dimensional data based on the new perimeter of the object or space represented in the acquired image in response to the received user input.

A dimensioning system to determine dimensional information for objects may be summarized as including an imager configured to acquire images; a user input/output system configured to display images and to receive user input; and a processor configured to identify objects in the acquired images, initially select one of the identified objects for processing, cause the acquired images to be displayed via the user input/output system along with an indication indicative of the initially selected one object, and computationally determine dimensional data for an object indicated by at least one user input received via the user input/output system.

The processor may be configured to determine a dimensional weight based on an estimated perimeter of the initially selected one object as represented in the acquired image in response to at least one user input confirming the initially selected one object as the object to be processed. The processor may be configured to computationally determine a dimensional weight based on a new perimeter of the initially selected one object represented in the acquired image in response to at least one user input indicative of the new perimeter. The processor may be configured to determine a dimensional weight based on an estimated perimeter of an object represented in the acquired image other than the initially selected one object in response to at least one user input selecting the other object as the object to be processed. The processor may be configured to determine a dimensional weight based on a user identified perimeter of an object represented in the acquired image other than the initially selected one object in response to at least one user input selecting the other object as the object to be processed and identifying at least a portion of the user identified perimeter. The processor may be configured to cause acquired images to be displayed via the user input/output system along with an indication indicative of the initially selected one object by displaying a draggable border about at least a portion of the initially selected object in the display of the acquired image. The processor may be further configured to cause acquired images to be displayed via the user input/output system along with an indication indicative of a user selected object by displaying a draggable border about at least a portion of a user selected object in the display of the acquired image. The user input/output system may include a touch-sensitive display. The processor may be further configured to cause the user input/output system to display dimensional data for one or more objects in the acquired images.

A dimensioning system to determine dimensional information for confined empty spaces may be summarized as including an imager to acquire images; a user input/output system to display images and to receive user input; and a processor configured to identify spaces in the acquired images, initially select one of the identified spaces for processing, cause the acquired images to be displayed via the user input/output system along with an indication indicative of selection of the initially selected space, and computationally determine dimensional data for a space indicated by at least one user input received via the user input/output system.

The processor may be configured to computationally determine the dimension data based on an estimated perimeter of the initially selected space as represented in the acquired image in response to at least one user input confirming the initially selected space as the space to be processed. The processor may be configured to computationally determine the dimensional data based on a new perimeter of the initially selected space represented in the acquired image in response to at least one user input indicative of the new perimeter. The processor may be configured to computationally determine the dimensional data based on an estimated perimeter of a space represented in the acquired image other than the initially selected space in response to at least one user input selecting the other space as the space to be processed. The processor may be configured to computationally determine the dimensional data based on a user identified perimeter of a space represented in the acquired image other than the initially selected space in response to at least one user input selecting the other space as the space to be processed and identifying at least a portion of the user identified perimeter. The processor may be configured to cause acquired images to be displayed via the user input/output system along with an indication indicative of the initially selected space by displaying a draggable border about at least a portion of the initially selected space in the display of the acquired image. The processor may be further configured to cause acquired images to be displayed via the user input/output system along with an indication indicative of a user selected space by displaying a draggable border about at least a portion of a user selected space in the display of the acquired image. The user input/output system may include a touch-sensitive display. The processor may be further configured to cause the user input/output system to display dimensional data related to one or more objects.

A computer-readable medium storing therein instructions to cause a computer to execute a process related to determining dimensional information for objects may be summarized as including displaying an image; identifying objects represented in the displayed image; initially selecting one object of the objects represented in the displayed image for processing; causing the displayed image and an indication indicative of the initially selected one object to be displayed; receiving user input; and determining dimensional data for an object indicated by at least one user input.

Determining dimensional data for an object indicated by at least one user input may include determining a dimensional weight based on an estimated perimeter of the initially selected one object as represented in the displayed image in response to at least one user input confirming the initially selected one object as the object to be processed. Determining dimensional data for an object indicated by at least one user input may include determining a dimensional weight based on a new perimeter of the initially selected one object represented in the displayed image in response to at least one user input indicative of the new perimeter. Determining dimensional data for an object indicated by at least one user input may include determining a dimensional weight based on an estimated perimeter of an object represented in the displayed image other than the initially selected one object in response to at least one user input selecting the other object as the object to be processed. Determining dimensional data for an object indicated by the at least one user input may include determining a dimensional weight based on a user identified perimeter of an object represented in the displayed image other than the initially selected one object in response to at least one user input selecting the other object as the object to be processed and identifying at least a portion of the user identified perimeter. Causing the displayed image and an indication indicative of the initially selected one object to be displayed may include causing the displayed image to be displayed and causing a draggable border about at least a portion of the initially selected one object to be displayed in the displayed image. Causing the displayed image and an indication indicative of the initially selected one object to be displayed may include causing the displayed image to be displayed and causing a draggable border about at least a portion of a user selected object to be displayed in the displayed image.

A computer-readable medium storing therein instructions to cause a computing system to execute a process related to determining dimensional information for objects may be summarized as including displaying an image; identifying objects or spaces represented in the displayed image; providing an indication to a user; receiving user input; and determining dimensional data for an object or space in response to the user input.

Providing an indication to a user may include indicating a problem related to an object or space of the objects or spaces in the displayed image to the user. Indicating a problem related to an object or space of the objects or spaces in the displayed image to the user may include indicating a problem in determining dimensional data for an object or space of the objects or spaces in the displayed image to the user. Receiving user input may include receiving the user input in the form of at least one of a keyboard entry, a computer mouse entry, a touch-screen device entry, a voice command, an audible command, and a bar code reading. The process may further include displaying a second image after receiving the user input; identifying objects or spaces represented in the second image; and receiving a second user input. Determining dimensional data for an object or space in response to the user input may include determining dimensional data for an object or space identified in the second image in response to the second user input. The process may further include determining dimensional data for one of the identified objects or spaces in the displayed image prior to receiving the user input. The process may further include displaying a dimensional data for an object or space.

A processor-implemented method of selecting an object from at least one object in an image to process information about the selected object may be summarized as including providing an image of the at least one object; selecting a first object of the at least one object in the image; updating the image to indicate the selection of the first object; receiving an input related to the selection of the first object; updating the image to indicate the input; and computationally determining dimensional data related to one of the at least one object using the input.

Updating the image to indicate the selection of the first object may include updating the image to indicate an estimated perimeter around the first object. Receiving an input related to the selection of the first object may include receiving the input selecting a second object of the at least one object that is different than the first object. Receiving an input related to the selection of the first object may include receiving the input to modify an aspect related to the indication of the selection of the first object. Receiving the input to modify an aspect related to the indication of the selection of the first object may include receiving the input to modify an estimated perimeter of the first object. Receiving an input related to the selection of the first object may include receiving the input as a user selection on a portion of a touch-screen device to select a second object of the at least one object. Receiving an input related to the selection of the first object may include receiving the input as a boundary drawn on a touch-screen device around an image of a second object of the at least one object to select the second object. Receiving an input related to the selection of the first object may include detecting a number of contacts at a number of positions on a touch-screen device, the contacts indicative of a number of corners of the first object. Receiving an input related to the selection of the first object may include receiving at least one user input indicative of a new position of a corner of the first object in the image displayed on a touch-screen device. Receiving an input related to the selection of the first object may include receiving at least one user input indicative of a perimeter of one of the at least one object on a touch-screen device indicative of a selection of the one of the at least one object. Determining dimensional data related to one of the at least one object using the input may include determining a dimensional weight of the one of the at least one object based on a computationally determined estimated perimeter of the one of the at least one object. Determining dimensional data related to one of the at least one object using the input may include determining a dimensional weight of the one of the at least one object based on a user identified perimeter of the one of the at least one object.

A processor-implemented method of selecting an object from at least one object in an image to process information about the selected object may be summarized as including displaying the image of the at least one object; selecting a first object of the at least one object in the image; updating the image to indicate the selection of the first object; receiving an input related to the selection of the first object; and updating the image to indicate the input.

Updating the image to indicate the selection of the first object may include updating the image to indicate an estimated perimeter around the first object. Receiving an input related to the selection of the first object may include receiving the input selecting a second object of the at least one object that is different than the first object. Receiving an input related to the selection of the first object may include receiving the input to modify an aspect related to the indication of the selection of the first object. Receiving the input to modify an aspect related to the indication of the selection of the first object may include receiving the input to modify an estimated perimeter of the first object. Receiving an input related to the selection of the first object may include receiving the input as a user selection on a portion of a touch-screen device to select a second object of the at least one object. Receiving an input related to the selection of the first object may include receiving the input as a boundary drawn on a touch-screen device around an image of a second object of the at least one object to select the second object. Receiving an input related to the selection of the first object may include detecting a number of contacts at a number of positions on a touch-screen device, the contacts indicative of a number of corners of the first object. Receiving an input related to the selection of the first object may include receiving at least one user input indicative of a new position of a corner of the first object in the image displayed on a touch-screen device. Receiving an input related to the selection of the first object may include receiving at least one user input indicative of a perimeter of one of the at least one object on a touch-screen device indicative of a selection of the one of the at least one object. Receiving an input may include receiving an audible command from a user. Receiving an input may include receiving a verbal command from a user. The method of claim may further include computationally determining dimensional data related to one of the at least one object using the input. Determining dimensional data related to one of the at least one object using the input may include determining a dimensional weight of the one of the at least one object based on a computationally determined estimated perimeter of the one of the at least one object. Determining dimensional data related to one of the at least one object using the input may include determining a dimensional weight of the one of the at least one object based on a user identified perimeter of the one of the at least one object.

Figure 1A:
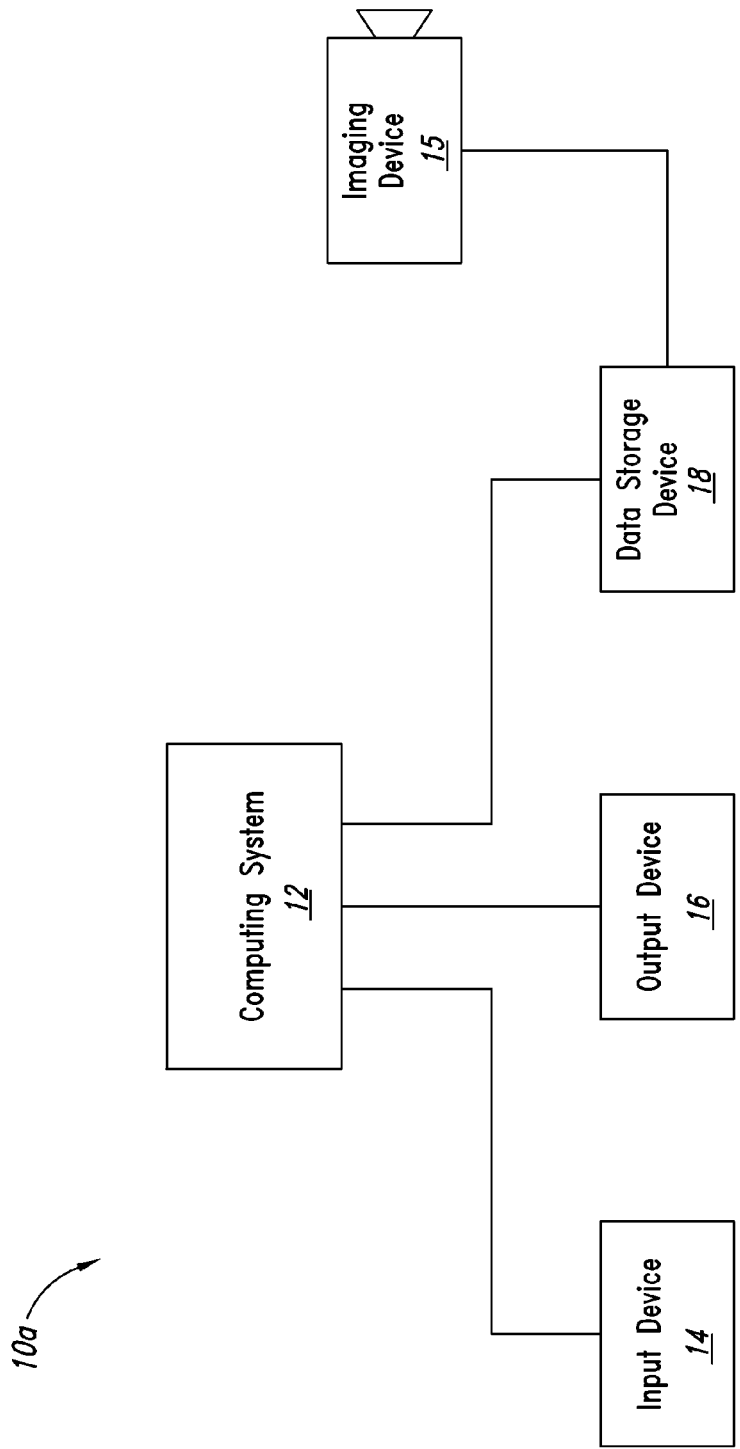
FIG. 1A is a block diagram showing a dimensioning system configured to determine dimensional information related to objects according to one non-limiting illustrated embodiment.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems, imagers (e.g., cameras), and/or transport mechanisms (e.g., conveyors) have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

Figure 1B:
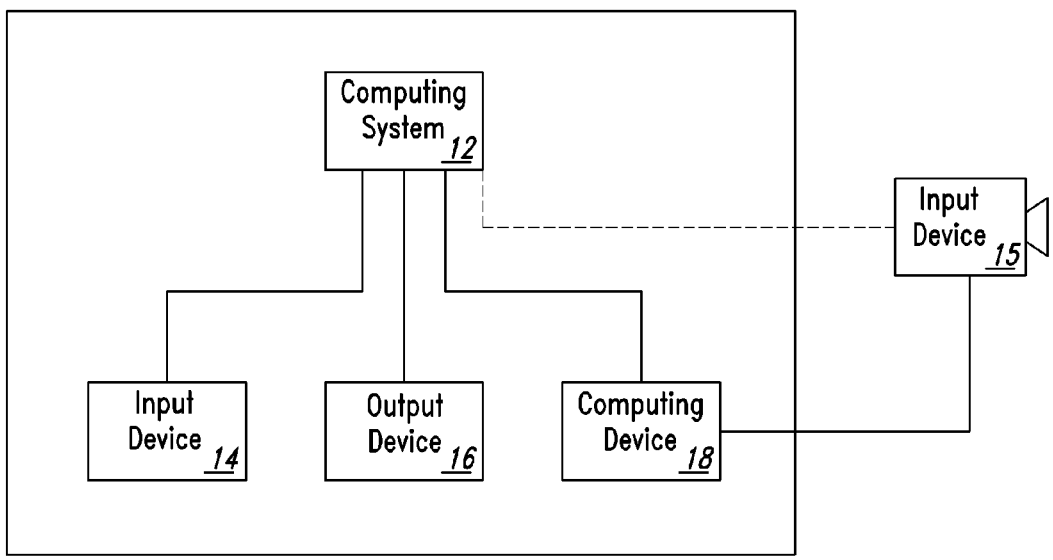
FIG. 1B is a block diagram showing another dimensioning system configured to determine dimensional information related to objects according to one non-limiting illustrated embodiment.

FIG. 1A shows a dimensioning system 10a configured to determine dimensional information related to objects according to one non-limiting illustrated embodiment. In one embodiment, the dimensioning system 10a includes a computing system 12 communicatively coupled with a user input device 14, a user output device 16, and a data storage device. In various embodiments, an imager 15 may be communicatively coupled to the data storage device 18, the computing system 12, or both. In one embodiment, the dimensioning system 10a may comprise a collection of individual standalone devices. In another embodiment, the dimensioning system 10a may comprise an integrated device plus at least one standalone device coupled to the integrated device, such as a handheld computer system by INTERMEC TECHNOLOGIES™ coupled to a standalone imager. For example, as shown in FIG. 1B, a computing system 12, a user input device 14, a user output device 16, and a data storage device 18 may be integral components of a dimensioning system 10b, with an external imager 15 coupled to either or both of the computing system 12 and the data storage device 18. In an alternative embodiment, a dimensioning system 10 may comprise one integrated device, such as a personal digital assistant (PDA) or one of the imaging-capable handheld computer systems by INTERMEC TECHNOLOGIES™. For example, as shown in FIG. 1C, a dimensioning system 10c may be an integrated device having a computing system 12, a user input device 14, a user output device 16, a data storage device 18, and an imager 15 as its integral components.

In some embodiments, the computing system 12 may be, for example, a desktop computer, a notebook computer, a handheld computer, a PDA, a workstation, a mainframe computer, or a processor in any type of the aforementioned computers or devices. The user input device 14 may be, for example, a keyboard, a computer mouse, a touch-screen device, a voice recognition device, a bar code reader, or any combination thereof. The user output device 16 may be, for example, a standalone monitor (e.g., a liquid-crystal display monitor or a cathode-ray tube monitor), a display screen, an auditory device, or a touch-screen device. In one embodiment, the user input device 14 and the user output device 16 may each be a part of a touch-screen device, which, as known in the art, is a display device that can detect the presence and location of a touch within a display area of the display device. For example, a touch-screen device including both the user input device 14 and the user output device 16 may have a screen that is operable to display an image and detect a contact to the screen by a user's finger, hand, or a writing tool such as a stylus. The data storage device 18 is preferably operable to store digital data that includes textual and numerical data, digitized images, and data input by a user of the dimensioning system 10, etc. The data storage device 18 may comprise a memory device such as, for example, a hard drive (whether as an integral part of the dimensioning system 10 or as a standalone device), a recording medium, or an integrated-circuit memory device (e.g., memory chip). The imager 15 may be, for example, a charge-coupled device (CCD), a complementary metal-oxide-semiconductor (CMOS) active-pixel sensor, or any similar image sensing or capture device that converts an optical image to a signal representative of the image.

Figure 1C:
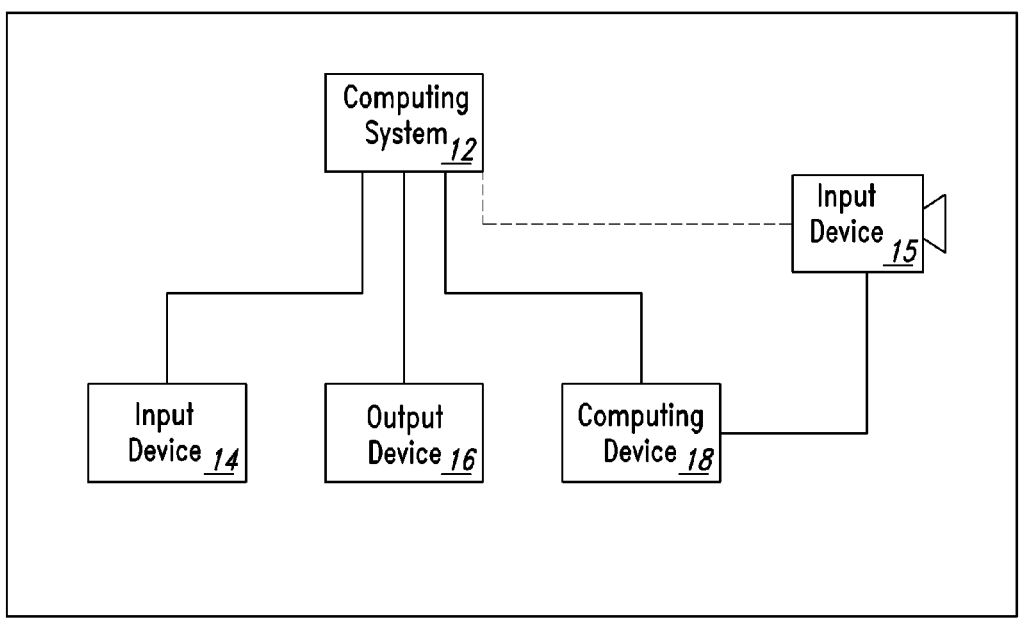
FIG. 1C is a block diagram showing yet another dimensioning system configured to determine dimensional information related to objects according to one non-limiting illustrated embodiment.

In operation, the dimensioning system 10 of FIGS. 1A-1C is preferably operable to acquire or capture an image of one or more objects and/or spaces using the imager 15 as image data. The one or more objects may be, for instance, parcels, packages, pallets, documents, boxes, or the like that need to have their respective dimensional weight or dimensions determined. The image data representing the captured image of the one or more objects and/or spaces may be stored in the data storage device 18. The captured image may also be displayed by the user output device 16 as directed by the computing system 12. The computing system 12 may, without any external input, automatically select one of the objects or spaces represented in the image as the object or space on which further data processing will be performed, e.g., to determine the dimensional weight of the selected object or a dimension related to the selected space. An indication of the selection of the object or space may be reflected in the displayed image. For example, the representation of the selected object or space may be highlighted, circled, flashed, marqueed, represented in a different color, or somehow marked to visually indicate to a viewer (e.g., user) of such selection by the computing system 12. As a result, the image of the one or more objects and/or spaces and the indication of the selection of one of the objects or spaces by the computing system 12 are displayed on the user output device 16 for user interaction before further computation by the computing system 12 is carried out. In an alternative embodiment, the computing system 12 makes no selection and simply causes the user output device 16 to display the image of the objects and/or spaces and awaits the user to make a user input selecting or identifying one of the objects or spaces before the computing system 12 performs computation based on the user input. In another alternative embodiment, the computing system 12 displays information about the object such as dimensions, color, data from a bar code symbol, or information indicating previously chosen objects.

A user of the dimensioning system 10 viewing the displayed image of the one or more objects may provide user input through the user input device 14. If the user agrees that it is the selected object on which further computation is to be performed, the user input may simply be one form of validation, such as, for example, a click of a computer mouse, a touch on a "Yes" button or user selectable icon on the user input device 14 in the form of a touch-screen device, pressing and releasing of a key on a keyboard, a check mark entered in an input field displayed on the user input device 14 in the form of a touch-screen device, or an audible or verbal command such as "Object 3," for example. If the user agrees with the selection but wishes to make some modification to the selection (e.g., to correct the estimated perimeter of the selected object before dimensional weight is calculated based on the estimated perimeter), the user input may include both a validation and a modification, or simply a modification. For example, the perimeter estimated by the computing system 12 may be entirely or partially incorrect due to insufficient lighting in the image or too many or overlapping objects in the image making it difficult to discern the perimeter of the selected object. In such case, the user may modify all or a portion of the perimeter of the selected object as estimated by the computing system 12 and show in the image on the output device 16. If, however, the user disagrees with the selection by the computing system 12 and wishes to select a different object among the objects represented in the displayed image, the user input may include a selection of a different object in the image. For instance, when an object A of two objects represented in the displayed image is selected by the computing system 12 and the user wishes to select an object B instead, the user may enter his/her selection of object B by one of various ways. In another situation, there may be an inadequate image for certain packages, such as when a package is viewed straight on, only two of the tree dimensions are visible. Accordingly, in one embodiment, the computing system 12 may request that the user perform a task, such as issuing the command "Please move right or left and re-image Object 3," for example.

The method by which the user enters his/her input may include, but is not limited to, one of the following: selecting or indicating at least a portion of the representation of object B in the displayed image; drawing or otherwise indicating a boundary around the representation of object B in the displayed image displayed on a touch-screen device; drawing a mark on or otherwise marking object B in the displayed image; and/or pointing out or otherwise indicating or selecting the corners or other specific features of object B in the displayed image. The user may take such action by, for example, manipulating a cursor or pointer icon displayed in the image using a pointer device (e.g., computer mouse, trackball, joystick, and rocker switch or arrow keys), or by using audible or verbal commands. The user may take such action by touching one or more portions of a touch sensitive screen on which the image is displayed, for example, to select portions of the objects B or user selectable icons.

Whether the user input validates or modifies the selection of the computing system 12, or selects a new object in the image, the user output device 16 may display the user input along with the representation of the at least one object in the image. For example, the user may validate the selection of a first object of the objects represented in the image yet at the same time modify the estimated perimeter of the representation of the first object by tracing or otherwise indicating the actual perimeter (i.e., indicated perimeter) of the representation of the first object on the display of the user output device 16. For instance, the user may select a portion of the perimeter of object and drag the selected portion using a pointer device (e.g., mouse, trackball, joystick, etc), a finger or a stylus (e.g., touch screen). In such case, the user output device 16 may show the traced line on the display as drawn by the user. If the user selects a second object of the objects represented in the image (e.g., by drawing a cross or a check mark on the second object), the user output device 16 may then represent the cross or check mark on the display. This provides an interaction between the dimensioning system 10 and the user in that the user provides user input as a part of the overall process of determining a dimensional value of the selected object (e.g., volume dimensioning), and the dimensioning system 10 provides an indication or feedback to the user of the user's input and performs computation based on the user input.

After the user provides input to the dimensioning system 10 through the user input device 14, the computing system 12 performs computation related to the selected object based on the user input. In the case of volume dimensioning where the dimensional weight of an object is computed, the computing system 12 computes the dimensional weight of the selected object based on an estimated or indicated perimeter of the selected object. More specifically, in one embodiment, the computing system 12 is able to estimate a length, width, and height of the selected object, for example, by using the estimated or indicated perimeter of the selected object. Once the dimensional weight of the selected object has been determined, the charge for shipment of the selected object may then be determined.

Thus, by allowing the user to validate the object selection by the computing system 12, or by allowing the user to select an object for the computing system 20 to perform volume dimensioning on, or both, issues related to inaccuracy caused by selection of a wrong object or an erroneous estimation of the object's perimeter (and thus dimensions) by the computing system 12 due to insufficient lighting or presence of numerous objects in the image or other issues may be avoided. The user interaction serves as a check in the dimensioning process, ensuring that the correct object is selected and that computation is based on dimensions derived from a correct perimeter of the selected object.

Figure 2A:
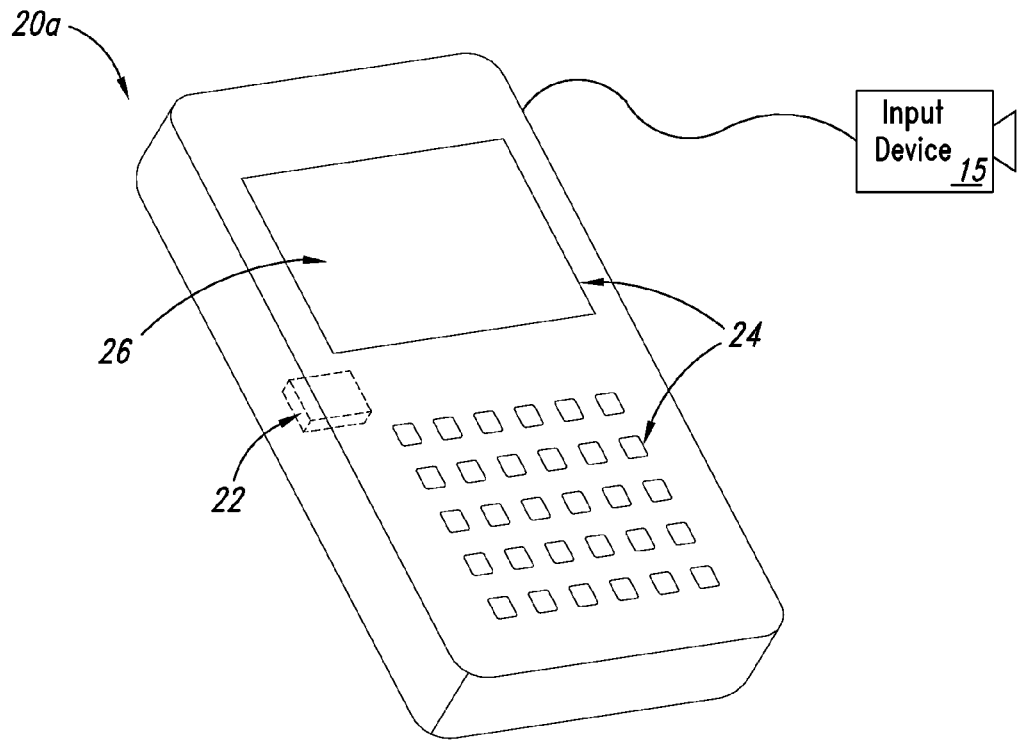
FIG. 2A is a block diagram showing an electronic device according to one non-limiting illustrated embodiment.

FIG. 2A shows an electronic device 20a according to one non-limiting illustrated embodiment. The electronic device 20a may be coupled to an imager 25 operable to acquire or otherwise capture images and provide image data representing the acquired or captured images to the electronic device 20a. In one embodiment, the electronic device 20a may include a processing component 22, a user input component 24, and a display component 26. The display component 26 may display an image provided by the imager 25, and such image may include one or more objects for which a dimensional value (e.g., a dimensional weight) is to be determined. The user input component 24 may receive input from a user of the electronic device 20a. In one embodiment, the display component 26 may be a liquid-crystal display, and the user input component 24 may be a keyboard having a plurality of keys for the user to enter input. In an alternative embodiment, the electronic device 20a may include a touch-screen display that serves as both the user input component 24 (e.g., touch-sensitive overlay) and the display component 26 (e.g., LCD, O-LCD). In another embodiment, the electronic device 20a may include a touch-screen display that serves as both the user input component 24 and the display component 26, while the electronic device 20a further includes a keyboard having a plurality of keys as another portion of the user input component 24. For example, the user may enter input via either the touch-screen display, the keyboard, or both. The processing component 22 is coupled to the user input component 24 and the display component 26.

In one embodiment, the processing component 22 is operable to determine from an image captured by the imager 25 an approximate perimeter of a first object of at least one object in the image. The processing component 22 may cause the display component 26 to display the captured image and an indicator that indicates the approximate perimeter of the first object. Upon receiving at least one input from the user via the user input component 24, the processing component 22 determines a dimensional value of one of the objects in the displayed image based on the user input. For example, the processing component 22 may perform computation for volume dimensioning on the first object if the user input validates or modifies the approximate perimeter of the first object. If the user input modifies the approximate perimeter of the first object, the computation will be based on the modified perimeter. Otherwise, in the case of the user input indicates validation, the computation will be based on the approximate perimeter determined by the processing component 22. Alternatively, if the user selects a second object different than the first object from objects represented in the displayed image, the processing component 22 may perform volume dimensioning on the second object to determine the dimensional weight of the second object.

Figure 2B:
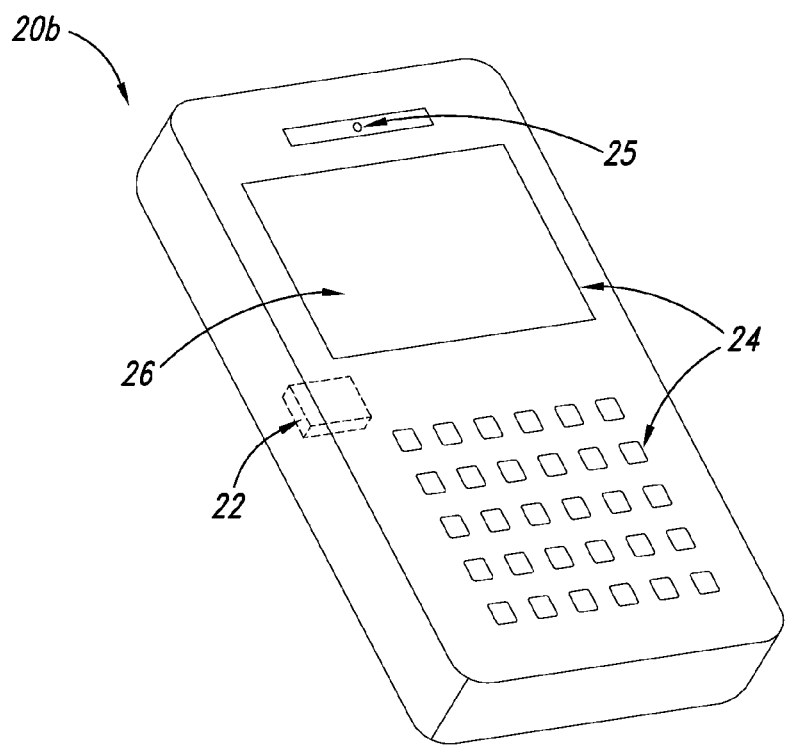
FIG. 2B is a block diagram showing another electronic device according to one non-limiting illustrated embodiment.

FIG. 2B shows a diagram of an electronic device 20b according to another non-limiting illustrated embodiment. The electronic device 20b may include a processing component 22, a user input component 24, a display component 26, and an imager 25. In one embodiment, the electronic device 20b may perform functions similar to those performed by the electronic device 20a of FIG. 2A. Therefore, in the interest of brevity, a description of the components of the electronic device 20b will not be repeated.

Figure 3A:
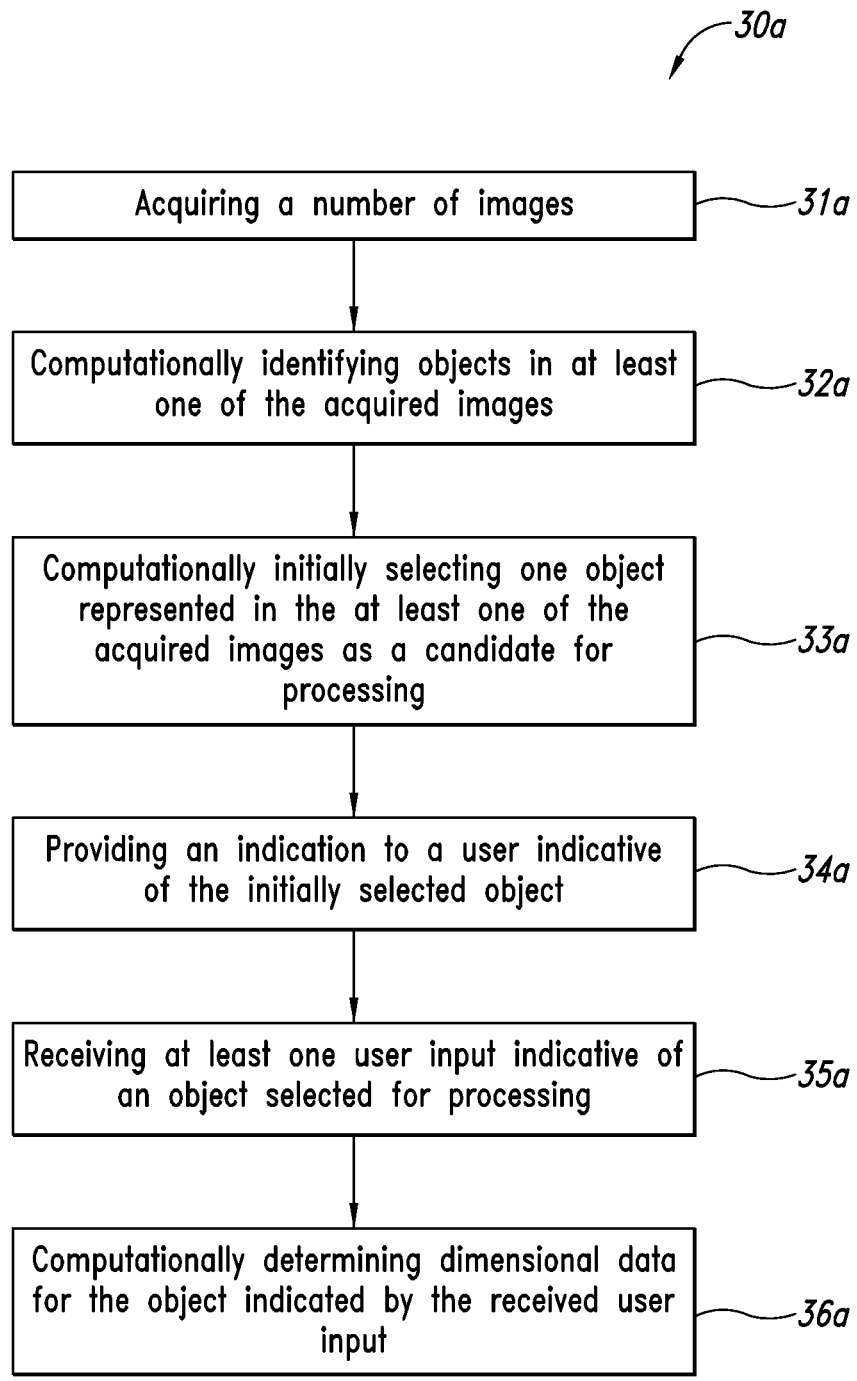
FIG. 3A is a flow chart showing a process of operating a dimensioning system to determine dimensional information for objects according to one non-limiting illustrated embodiment.

FIG. 3A shows a flow chart of a process 30a of operating a dimensioning system to determine dimensional information for objects according to one non-limiting illustrated embodiment. In one embodiment, at 31a, a number of images is captured or acquired. At 32a, objects in at least one of the acquired images are computationally identified, for example, by a processor-based system or a computing system. At 33a, one object represented in the at least one of the acquired images is computationally initially selected as a candidate for processing. In one embodiment, the selection is made automatically by a computing system or a processor-based system without any human interaction. An indication to a user to indicate the initially selected object is provided at 34a. At least one user input indicative of an object selected for processing is received at 35a. Then, at 36a, dimensional data for the object indicated by the received user input is computationally determined. For example, in one embodiment, a dimension of at least one of a box, a package, a parcel, a pallet or a document represented in the acquired image is computationally determined.

In one embodiment, the at least one user input received may include a user selection that confirms the initially selected one object as the object for processing. In another embodiment, the at least one user input received may include a user selection that indicates an object other than the initially selected one object as the object for processing. For example, when the user desires to determine dimensional data for an object that is different than the object initially selected by an automatic process executed in a computing system, the user manually selects the user-selected object before the computing system proceeds further. When the user input confirms the initially selected one object as the object for processing, in one embodiment, a dimensional weight of the initially selected one object is determined based on an estimated perimeter of the initially selected one object as represented in the acquired image. Alternatively, when the user input selects a different object, a dimensional weight of the user-selected object is determined based on an estimated perimeter of the user-selected object as represented in the acquired image. Further, when the user input selects a different object, process 30a may additionally include (not shown) providing an indication to the user indicative of a currently selected object to visually distinguish the currently selected object in a display of the acquired image from any other object represented in the display of the acquired image.

In one embodiment, the at least one user input received indicates at least a portion of a new perimeter for the object for processing. In such case, in one embodiment, the dimensional data is computationally determined based on the new perimeter, as indicated by the user input, of the object represented in the acquired image. For instance, when an estimated perimeter of the selected object, as represented in the acquired image on a display, is partially or entirely incorrect (e.g., due to insufficient lighting or the presence of numerous objects when the image is acquired), the user may modify the estimated perimeter so that dimensional data for the selected object is computed not based on incorrect information (e.g., incorrect estimated perimeter) but based on modified information.

In one embodiment, the user is notified of the initial selection of the initially selected one object by a display of the acquired image, where the initially selected one object is visually distinguished in the display of the acquired image from any other objects represented in the display of the acquired image. In one embodiment, the initially selected one object is visually distinguished from any other objects represented in the display of the acquired image with a display of a border about at least a portion of the initially selected object in the display of the acquired image. In such a case, in an embodiment, the at least one user input received may include at least one signal representing a position in the image that indicates a position of at least a portion of a new perimeter for the object for processing. In an alternative embodiment, the initially selected one object is visually distinguished from any other objects represented in the display of the acquired image with a display of a draggable border about at least a portion of the initially selected object in the display of the acquired image. For example, the at least one user input received may include at least one signal representing a dragging of the draggable border to a new position that indicates at least a portion of a new perimeter for the object for processing.

It should be appreciated by one skilled in the art that the process 30a may be implemented in one integrated device or in multiple standalone devices. For example, the process 30a may be implemented in any of the computing system 10a, 10b, and 10c of FIGS. 1A-1C, and the process 30a may be implemented in the electronic device 20a of FIG. 2A or in the electronic device 20b or FIG. 2B.

Figure 3B:
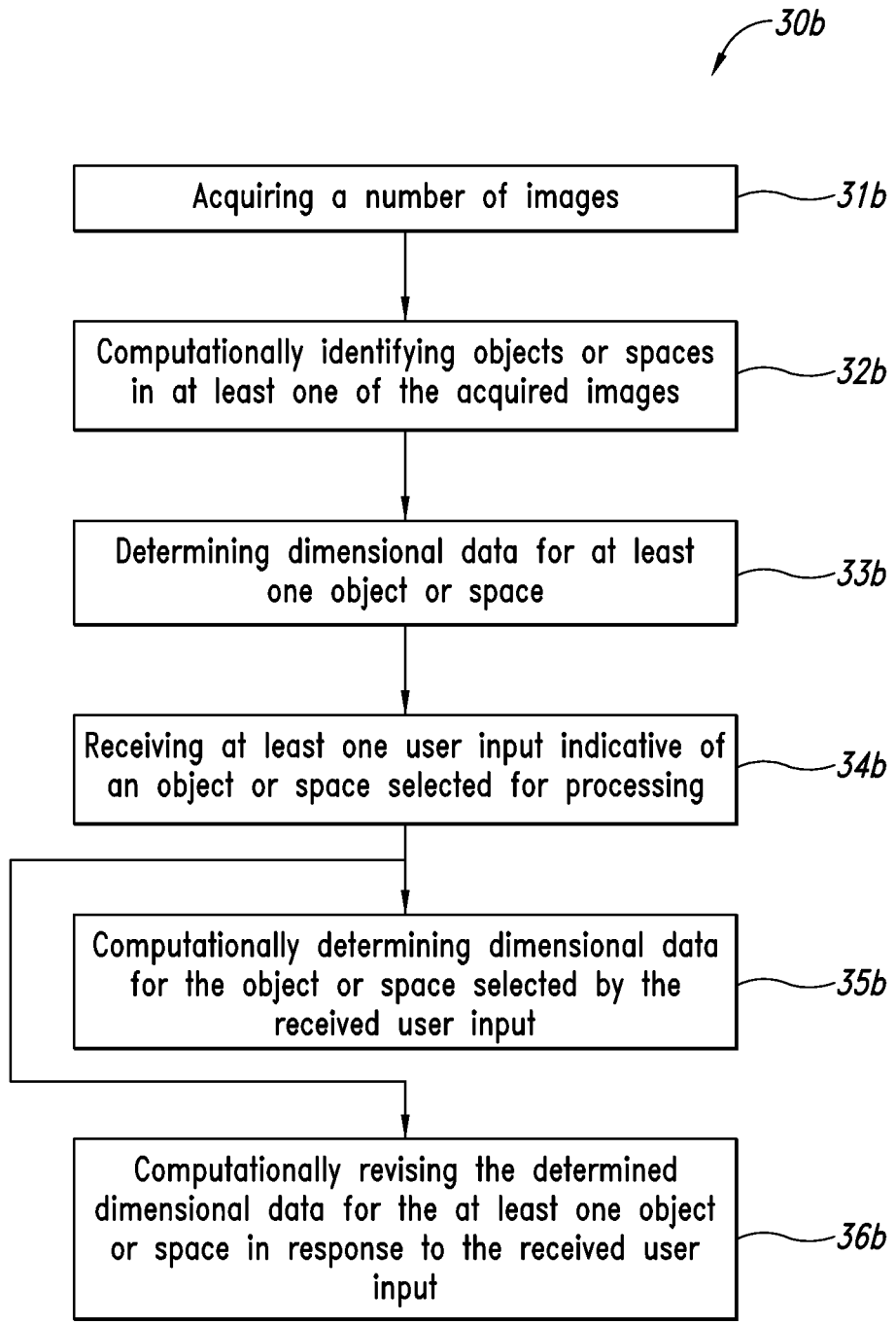
FIG. 3B is a flow chart showing a process of operating a dimensioning system to determine dimensional information for objects according to another non-limiting illustrated embodiment.

FIG. 3B shows a flow chart of a process 30b of operating a dimensioning system to determine dimensional information for objects according to one non-limiting illustrated embodiment. In one embodiment, at 31b, a number of images is captured or acquired. At 32b, objects or spaces in at least one of the acquired images are computationally identified, for example, by a processor-based system or a computing system. At 33b, the dimensional data for at least one object or space is determined. In one embodiment, a processor-based system or a computing system automatically selects an object or space in an acquired image and computes a dimensional data for the selected object or space without any human interaction. At least one user input indicative of an object or space selected for processing is received at 34b. In one embodiment, the user input may indicate an agreement with the selection of the object or space for which a dimensional data is determined. In another embodiment, the user input may select a different object or space for which a dimensional data is to be determined.

The process 30b may further computationally determine dimensional data for the object or space selected by the received user input at 35b. For example, in one embodiment, this may be due to the user input selecting an object or space that is different from the object or space for which a dimensional data has been determined. The process 30b may further computationally revise the determined dimensional data for the at least one object or space in response to the received user input at 36b. For example, in one embodiment, the user may agree with the selection of the object or space but disagree with the certain aspect of the selection (e.g., the border of the selected object or space which is used to determine the volume of the object or space). In such case, the user input may be a modification to that aspect of the selection of the object or space, such as, for example, a change in the selected object's or space's border.

The user input may come in different forms. For example, the user input may be a keyboard entry on a keyboard, a click or "click and drag" using a computer mouse, entry through a touch-sensitive screen by the user's finger or a stylus or similar tool, a voice command including at least one command word, an audible command such as a clap or some recognizable sound, or entry by a bar code reader.

As with the process 30a, the process 30b may be implemented in one integrated device or in multiple standalone devices. For example, the process 30b may be implemented in any of the computing system 10a, 10b, and 10c of FIGS. 1A-1C, and the process 30b may be implemented in the electronic device 20a of FIG. 2A or in the electronic device 20b or FIG. 2B.

Figure 4A:
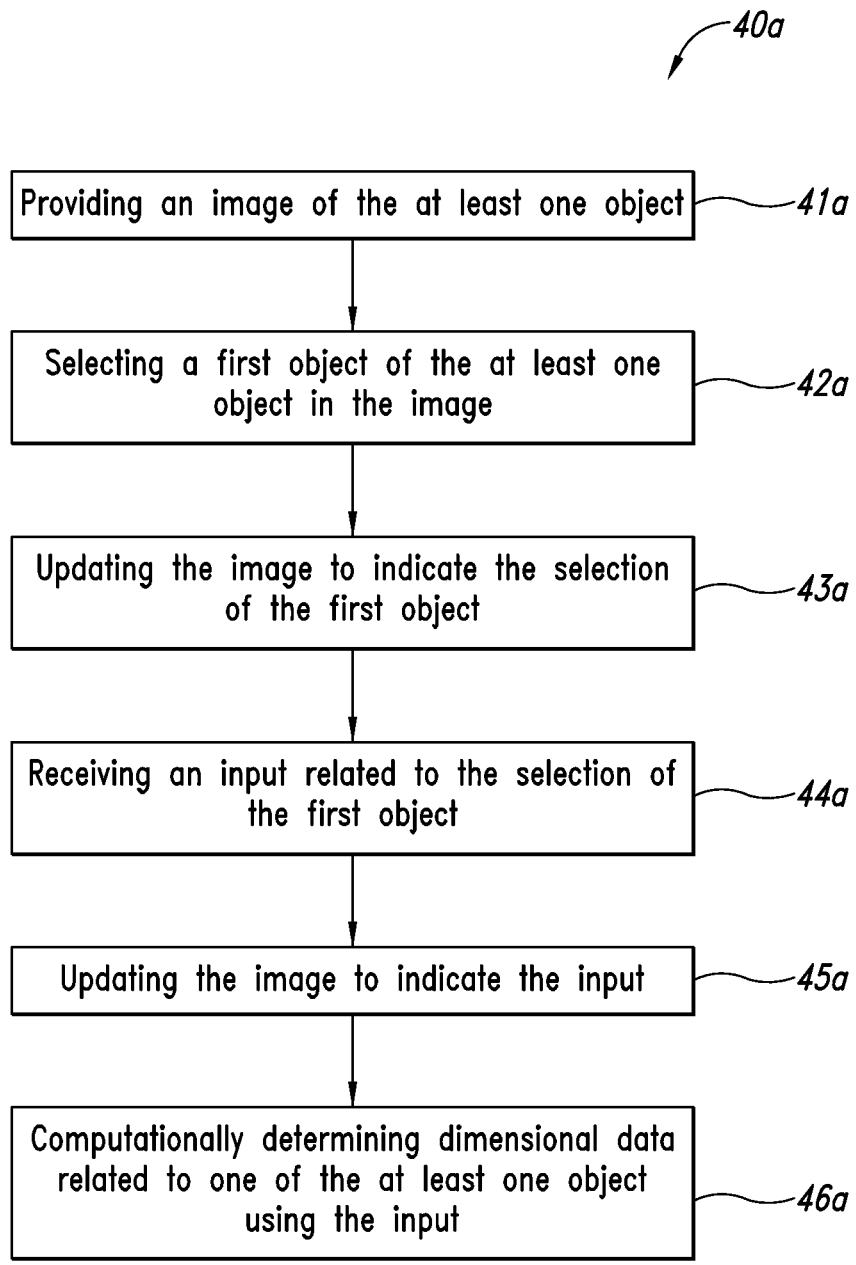
FIG. 4A is a flow chart showing a processor-implemented method of selecting an object from at least one object in an image to process information about the selected object according to one non-limiting illustrated embodiment.

FIG. 4A shows a flow chart of a process 40a of selecting an object from at least one object in an image to process information about the selected object according to one non-limiting illustrated embodiment. In one embodiment, at 41a, an image of the at least one object is provided. At 42a, a first object of the at least one object in the image is selected. For example, a computing system executing the process 40a may be configured to automatically select the first object of the at least one object in the image without any human interaction. The image is updated to indicate the selection of the first object at 43a. At 44a, an input related to the selection of the first object is received. The image is then updated to indicate the input at 45a. At 46a, dimensional data related to one of the at least one object is computationally determined using the input.

In one embodiment, the image is updated to indicate an estimated perimeter around the first object when updating the image to indicate the selection of the first object. In one embodiment, the input (e.g., a user input manually entered by a user) selects a second object different than the first object. In another embodiment, the input modifies an aspect related to the indication of the selection of the first object. For example, in an embodiment, one aspect related to the indication of the selection of the first object may be an estimated perimeter of the first object as shown in the image, and accordingly the input may modify the estimated perimeter of the first object.

In some embodiments, the input may be a mark or a line drawn on, for example, a touch-screen device by a user to either validate the selection of the first object or to select a second object different than the first object. The input may also be a user input to point out corners of the first object in the image on, for example, a touch-screen device. When an estimated perimeter of the first object is also indicated in the image, the input may be a user input to correct a corner position of the estimated perimeter by moving a corner point of the first object in the image on, say, a touch-screen device. The estimated perimeter of the first object may be a draggable perimeter displayed on a display device and modifiable by a user dragging at least a portion of the estimated perimeter (e.g., in a click-and-drag or point-and-drag fashion) to change the estimated perimeter into a modified boundary that more closely resembles the real perimeter of the first object. Alternatively, the input may be a boundary line drawn by the user to indicate the selection of an object approximately surrounded by the line drawn by the user. As indicated previously, the input may be done by using the user's finger, a stylus or similar tool, by using a keyboard, or by using a computer mouse.

Accordingly, in one embodiment, the input received may be a user selection on a portion of a touch-screen device to select a second object of the at least one object. In another embodiment, the input received may be a boundary drawn on a touch-screen device around an image of a second object of the at least one object to select the second object that is different than the first object. In one embodiment, receiving an input may include detecting a number of contacts at a number of positions on a touch-screen device where the contacts indicate a number of corners of the first object. In a different embodiment, the received input may include at least one user input indicative of a new position of a corner of the first object in the image displayed on a touch-screen device. Alternatively, the received input may include at least one user input indicative of a perimeter of one of the at least one object on a touch-screen device indicative of a selection of the selected object.

In one embodiment, determining dimensional data related to one of the at least one object using the input may include determining a dimensional weight of the one of the at least one object based on a computationally determined estimated perimeter of the one of the at least one object. For instance, when the user input confirms the initial selection of the first object by a computing system, the computing system will determine the dimensional weight of the first object based on the estimated perimeter as determined by the computing system. In an alternative embodiment, determining dimensional data related to one of the at least one object using the input may include determining a dimensional weight of the one of the at least one object based on a user identified perimeter of the one of the at least one object. For example, when the user input modifies an estimated perimeter of the first object as determined by the computing system, the computing system determines the dimensional weight of the first object based on the modified perimeter. If the user input instead selects a second object that is not the first object, the computing system may determine the dimensional weight of the user-selected second object based on an estimated perimeter of the second object as determined by the computing system or based on a user-identified perimeter of the second object.

It should be appreciated by one skilled in the art that the process 40a may be implemented in one integrated device or in multiple standalone devices. For example, the process 40a may be implemented in any of the computing system 10a, 10b, and 10c of FIGS. 1A-1C, and the process 40a may be implemented in the electronic device 20a of FIG. 2A or in the electronic device 20b or FIG. 2B.

Figure 4B:
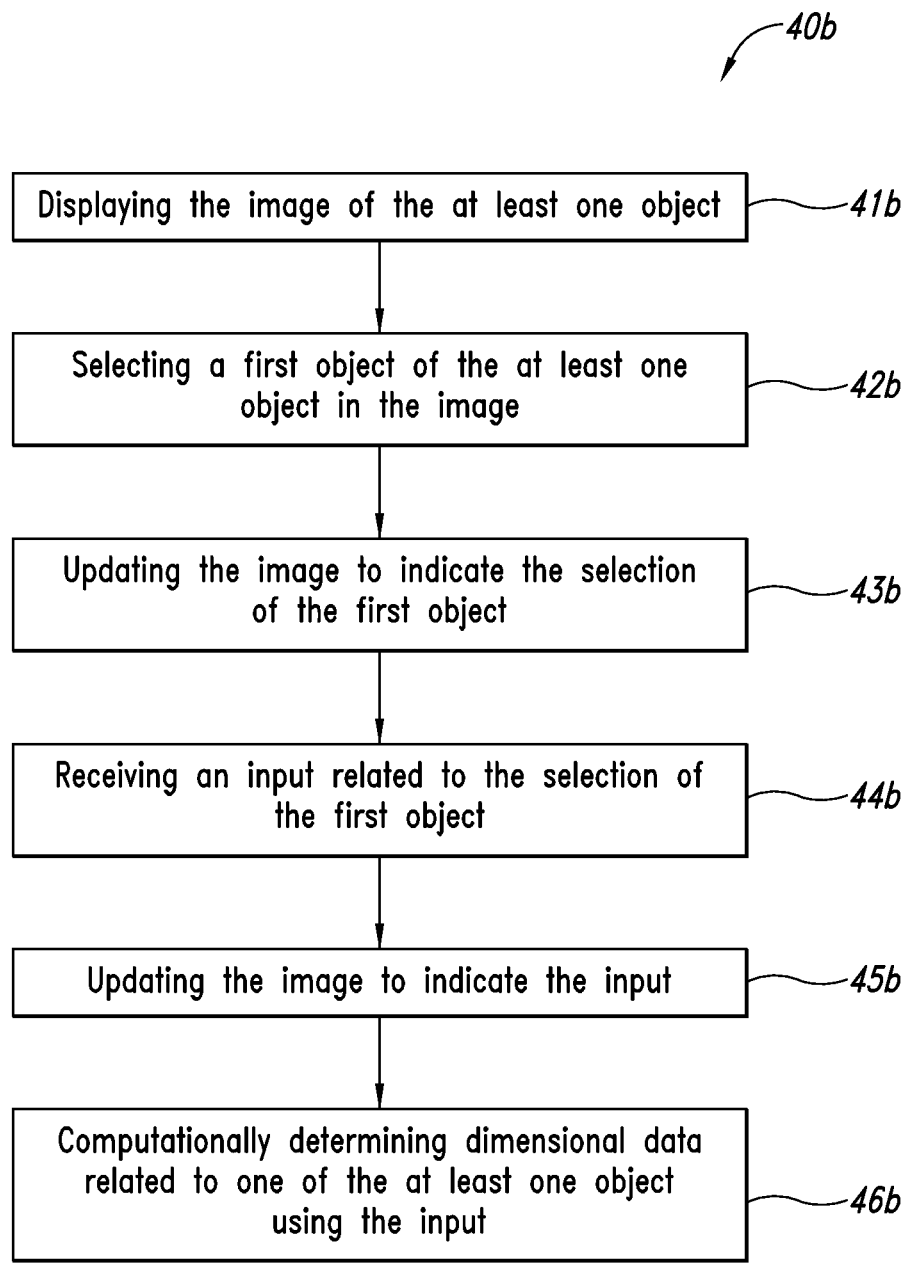
FIG. 4B is a flow chart showing a processor-implemented method of selecting an object from at least one object in an image to process information about the selected object according to another non-limiting illustrated embodiment.

FIG. 4B shows a flow chart of a process 40b of selecting an object from at least one object in an image to process information about the selected object according to one non-limiting illustrated embodiment. In one embodiment, at 41b, the image of the at least one object is displayed. At 42b, a first object of the at least one object in the image is selected. For example, a processor-based system or a computing system executing the process 40b may be configured to automatically select the first object of the at least one object in the image without any human interaction. The image is updated to indicate the selection of the first object at 43b. At 44b, an input related to the selection of the first object is received. The image is updated to indicate the input at 45b. In one embodiment, the process 40b may further computationally determine dimensional data related to one of the at least one object using the input at 46b.

As with the process 40a, the process 40b may be implemented in one integrated device or in multiple standalone devices. For example, the process 40b may be implemented in any of the computing system 10a, 10b, and 10c of FIGS. 1A-1C, and the process 40b may be implemented in the electronic device 20a of FIG. 2A or in the electronic device 20b or FIG. 2B.

Figure 5A:
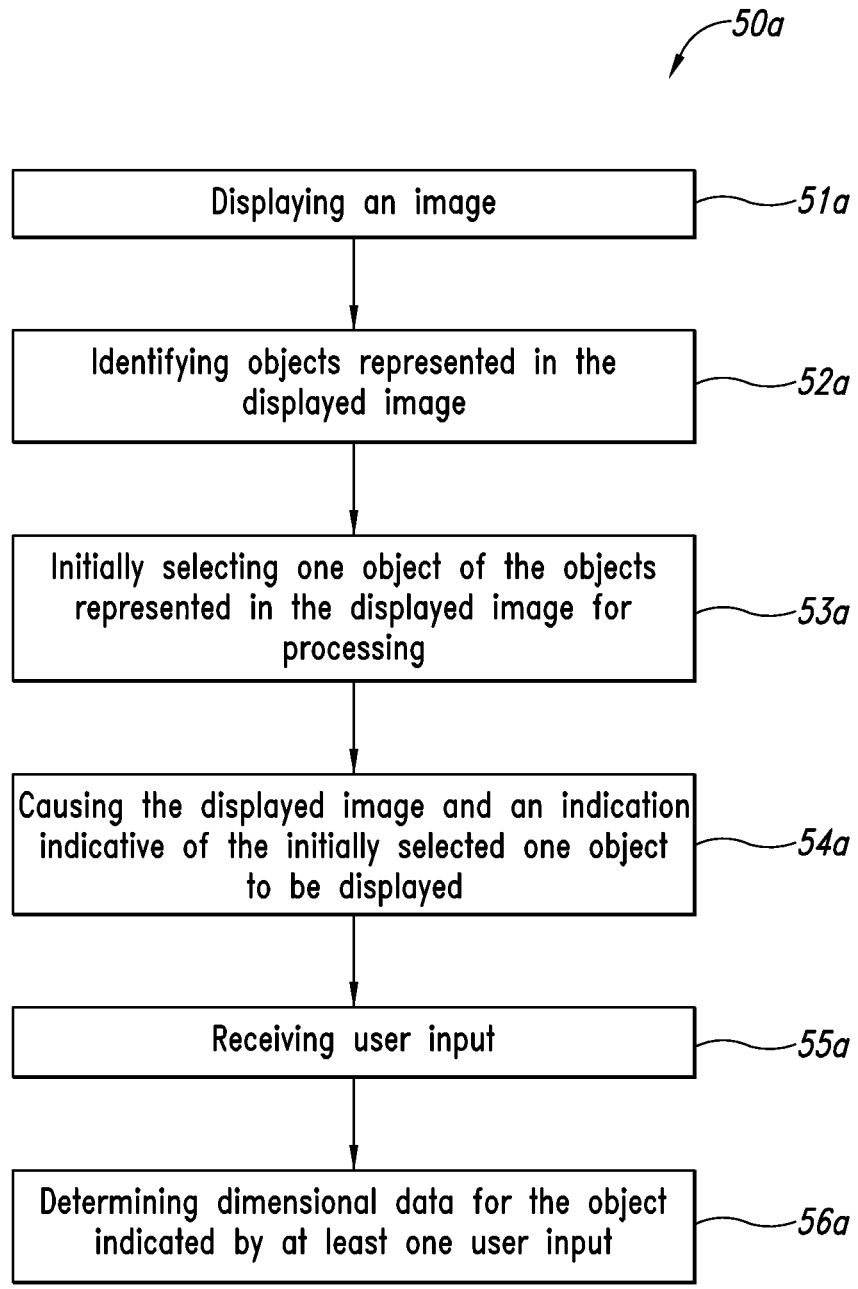
FIG. 5A is a flow chart showing a process performed by a program stored in a computer-readable medium according to one non-limiting illustrated embodiment.

FIG. 5A shows a flow chart of a process 50a performed by instructions (e.g., a computer-executable program) stored in a computer-readable medium according to one non-limiting illustrated embodiment. In one embodiment, the process 50a may be instructions in the form of a software program stored in a compact disc (CD), a memory device such as a universal serial bus (USB) memory device or a memory chip of a computing device. Accordingly, the process 50a may be executed by a device, such as a computer, that reads the instruction. In one embodiment, an image is displayed at 51a. At 52a, objects represented in the acquired image are identified. At 53a, one object of the objects represented in the acquired image is initially selected for processing. At 54a, the acquired image and an indication indicative of the initially selected one object are displayed. User input is received at 55a. At 56a, dimensional data for the object indicated by at least one user input is determined.

In one embodiment, determining dimensional data for the object indicated by at least one user input may include determining a dimensional weight based on an estimated perimeter of the initially selected one object as represented in the acquired image in response to at least one user input confirming the initially selected one object as the object to be processed. For example, when a user confirms the estimated perimeter of initially selected object A, the dimensional weight of object A is determined based on the estimated perimeter. Alternatively, determining dimensional data for the object indicated by at least one user input may include determining a dimensional weight based on a new perimeter of the initially selected one object represented in the acquired image in response to at least one user input indicative of the new perimeter. For example, when a user modifies an estimated perimeter of initially selected object A to form a new perimeter, the dimensional weight of object A is determined based on the new perimeter.

In one embodiment, determining dimensional data for the object indicated by at least one user input may include determining a dimensional weight based on an estimated perimeter of an object represented in the acquired image other than the initially selected one object in response to at least one user input selecting the other object as the object to be processed. For example, when the user selects object B, which is different than object A as initially selected by the computer-executable program, the dimensional weight of object B may be determined based on an estimated perimeter of object B as determined by the program. In another embodiment, determining dimensional data for the object indicated by at least one user input may include determining a dimensional weight based on a user identified perimeter of an object represented in the acquired image other than the initially selected one object in response to at least one user input selecting the other object as the object to be processed and identifying at least a portion of the user identified perimeter. For instance, when the user selects object B and identifies a user-identified perimeter of object B, the dimensional weight of object B may be determined based on the user-identified perimeter. The user-identified perimeter may also be displayed as a feedback to the user on a display of the acquired image to acknowledge the user input.

In one embodiment, causing the acquired image and an indication indicative of the initially selected one object to be displayed may include causing the acquired image to be displayed and causing a draggable border about at least a portion of the initially selected one object to be displayed in a display of the acquired image. In another embodiment, causing the acquired image and an indication indicative of the initially selected one object to be displayed may include causing the acquired image to be displayed and causing a draggable border about at least a portion of a user selected object to be displayed in a display of the acquired image. In either case, with the draggable border displayed, a user may drag the draggable border to make modifications to correct error in the displayed border.

Figure 5B:
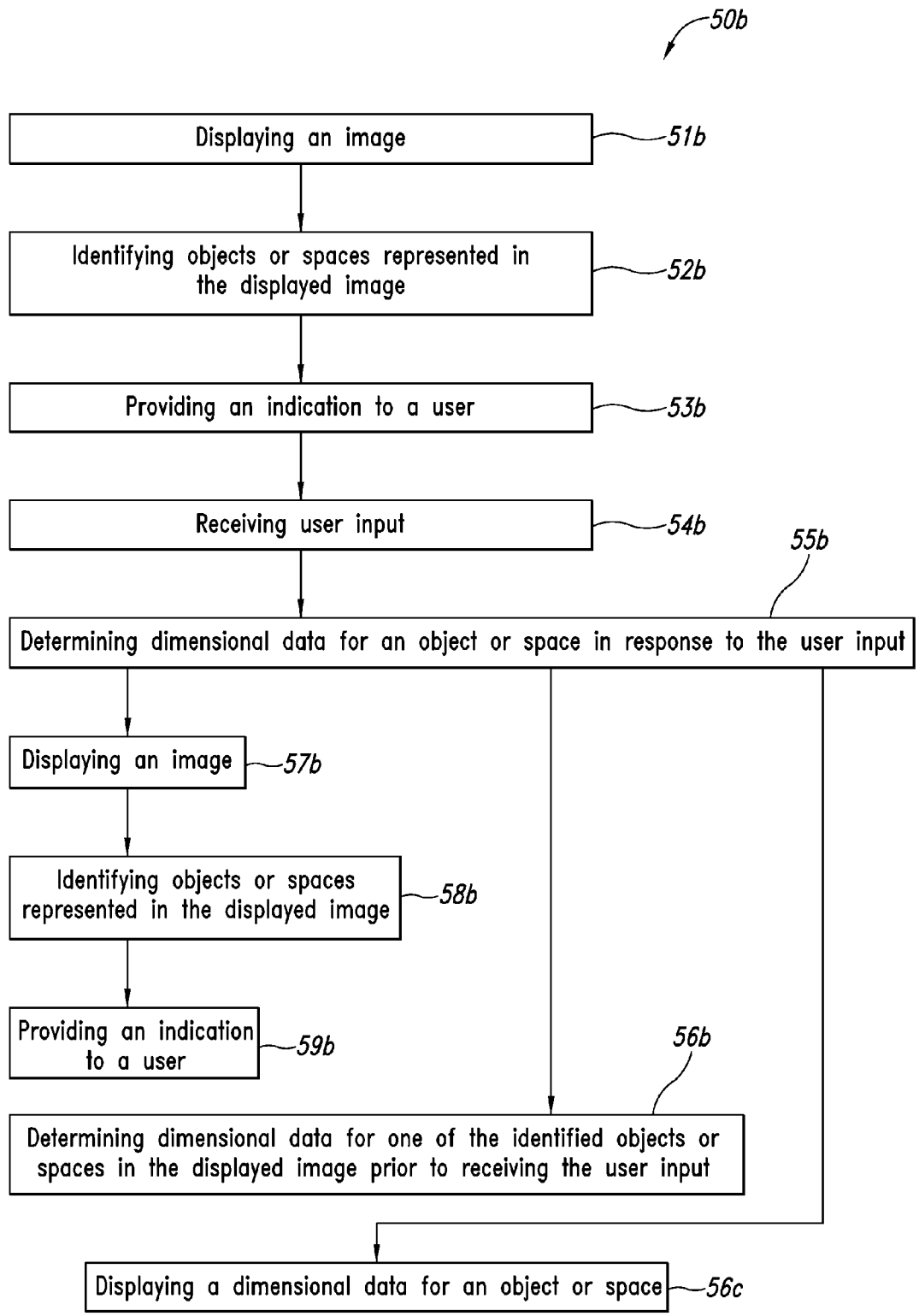
FIG. 5B is a flow chart showing a process performed by a program stored in a computer-readable medium according to another non-limiting illustrated embodiment.

FIG. 5B shows a flow chart of a process 50b. Similar to the process 50a, the process 50b may be performed by instructions (e.g., a computer-executable program) stored in a computer-readable medium according to one non-limiting illustrated embodiment. In one embodiment, the process 50b may be instructions in the form of a software program stored in a CD, a memory device such as a USB memory device or a memory chip of a computing device. Accordingly, the process 50b may be executed by a device, such as a computer, that reads the instruction. In one embodiment, an image is displayed at 51b. At 52b, objects or spaces represented in the displayed image are identified. At 53b, an indication is provided to a user. For example, an indication that one of the objects or spaces in the displayed image is automatically selected for further processing, e.g., to determine a dimensional data related to the selected object or space. User input is received at 54b. At 55b, dimensional data for an object or space is determined in response to the user input. For example, if the user input confirms the selection of the object or space, then dimensional data related to the selected object or space is determined. On the other hand, if the user input selects a different object or space than the one automatically selected, then dimensional data of the user selected object or space is determined. Alternatively, if the user input modifies an aspect related to the selection of the automatically selected object or space, such as the border of the object or space, then dimensional data of the automatically selected object or space is determined based on the user-modified border, for instance.

In one embodiment, the process 50b may further determine dimensional data for one of the identified objects or spaces in the displayed image prior to receiving the user input at 56b. In another embodiment, the process 50b may further display a dimensional data for an object or space. For example, a dimensional data, such as length, width, height, area, or volume, of the automatically selected object or space may be displayed before and/or after the user input is received. In yet another embodiment, at 57b, the process 50b may display a second image after receiving the user input. Objects or spaces represented in the second image are identified at 58b. Another user input is received at 59b.

Figure 6A:
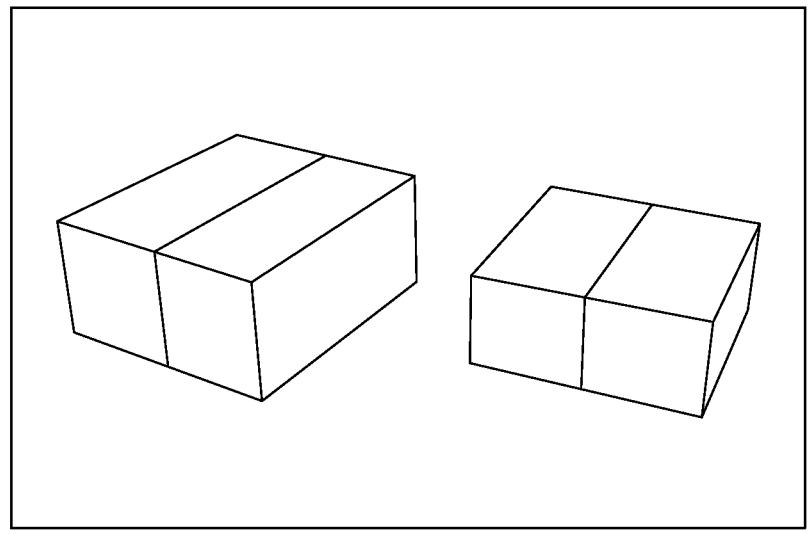
FIG. 6A is a diagram of an image of two objects according to one non-limiting illustrated embodiment.

FIG. 6A shows an image of two objects as taken by, for example, the imager 15 of the dimensioning system 10 or the imager 25 of the electronic device 20, according to one non-limiting illustrated embodiment. In this example, there are two objects, i.e., parcels, in the image.

Figure 6B:
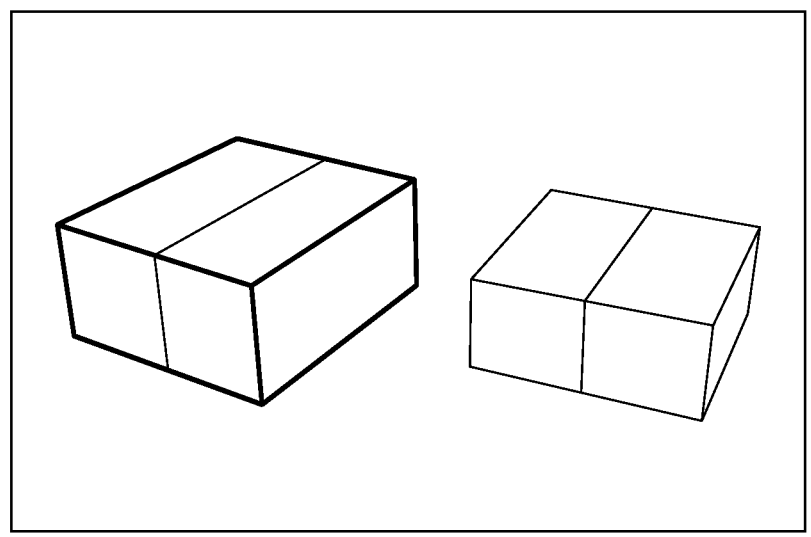
FIG. 6B is a diagram of the image of the two objects of FIG. 6A and an indication of the selection of one of the two objects according to one non-limiting illustrated embodiment.

FIG. 6B shows the image of the two objects of FIG. 6A and an indication of the selection of one of the two objects according to one embodiment. For example, after the computing system 12 of the dimensioning system 10 or the processing component 22 of the electronic device 20 automatically selects the parcel on the left in the image, the computing system 12 or the processing component 22 causes the selection of the parcel on the left to be shown in the image as well. This way, a user using the dimensioning system 10 or the electronic device 20 is informed of the automatic selection of the parcel on the left. In the example shown in FIG. 6B, the indication that the parcel on the left has been selected is presented as an estimated perimeter around the selected parcel. Further, the indication may also include lines showing the estimated edges of the selected parcel, as can be seen in FIG. 6B. The estimation of the perimeter and edges of a selected object is done by using pertinent algorithm with the image of the objects as known in the art.

Figure 6C:
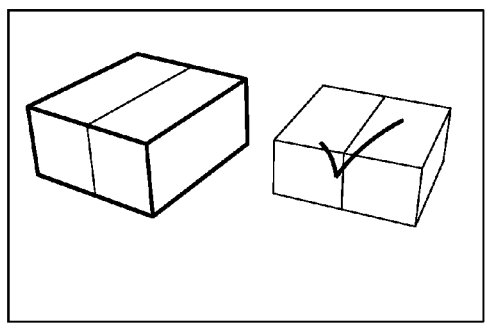
FIG. 6C is a diagram of the image of the two objects of FIG. 6A, an indication of the selection of one of the two objects, and an indication of a user selection of the other of the two objects according to one non-limiting illustrated embodiment.
Figure 6D:
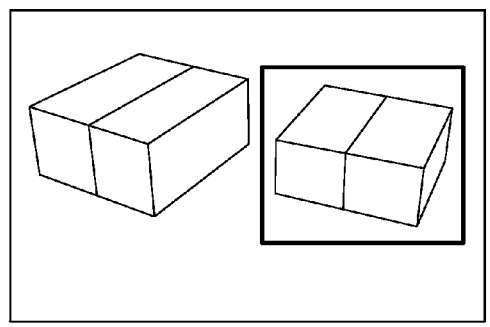
FIG. 6D is a diagram of the image of the two objects of FIG. 6A, an indication of the selection of one of the two objects, and an indication of a user selection of the other of the two objects according to another non-limiting illustrated embodiment.

FIG. 6C shows the image of the two objects of FIG. 6A, an indication that the parcel on the left has been automatically selected, and an indication of a user selection of the parcel on the right according to one embodiment. FIG. 6D shows the image of the two objects of FIG. 6A, an indication that the parcel on the left has been automatically selected, and an indication of a user selection of the parcel on the right according to another embodiment. In one embodiment, a user of the dimensioning system 10 or the electronic device 20 may override, or correct, the automatic selection by making a user input to select the parcel that should have been selected by the automatic process. The user may make such selection in one of many ways. For example, as shown in FIG. 6C, the user may draw a check mark on the desired object, i.e., the parcel on the right, with a stylus on the touch screen of, say, a handheld device to select the parcel on the right. Alternatively, the user may circle or box the parcel on the right with a stylus on the touch screen of the handheld device, as shown in FIG. 6D. The user may also make his/her selection by drawing a cross on the object of choice, placing a cursor on the object of choice and clicking on a computer mouse, or making selection via a keyboard, for example.

Figure 6E:
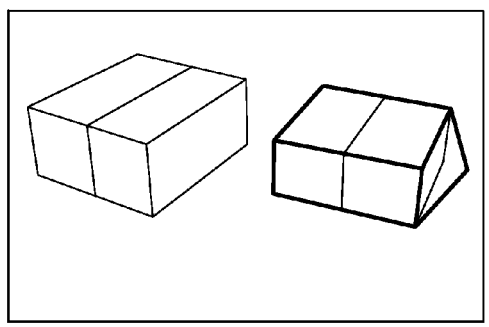
FIG. 6E is a diagram of an image of two objects and an indication of an estimated boundary of one of the two objects according to one non-limiting illustrated embodiment.
Figure 6F:
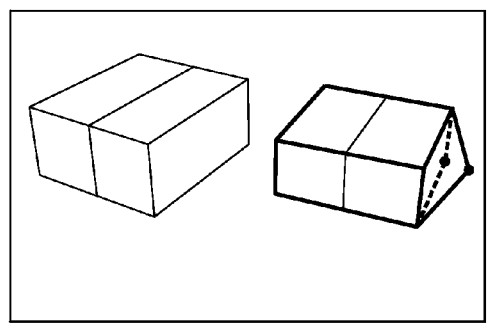
FIG. 6F is a diagram of the image of the two objects of FIG. 6E and an indication of a user modification of the estimated boundary of one of the two objects according to one non-limiting illustrated embodiment.

FIG. 6E shows an image of two parcels and an indication of an estimated perimeter of the parcel on the right according to one embodiment. In the example shown, the system did not correctly detect the borders of the selected object, i.e., the parcel on the right, and thus the estimated perimeter shown in the image is not entirely correct. This may be due to poor contrast as a result of insufficient lighting when the image was captured. FIG. 6F shows an example of a user modification of the estimated perimeter of the parcel on the right of FIG. 6E according to one embodiment. In one embodiment, the user may make the correction by selecting a corner and moving this corner to its proximate correct position. In an embodiment, the user may point directly the correct location, e.g., by tapping a touch screen with a stylus or the user's finger, to modify the perimeter. Alternatively, the user may approximately draw the correct borders of the object, either entirely or only where the estimation is incorrect, to make the correction.

Thus, systems and methods to allow user interaction in volume dimensioning an object are disclosed herein and should greatly improve upon the inaccuracy problem described above. For instance, when a dimensioning application selects an incorrect object for dimensioning or when the estimated perimeter of the selected object is erroneous, a user can intervene by selecting the correct object for dimensioning or by modifying the estimated perimeter. This user interaction provides a way for the user to validate or modify selections made by the application, and thereby avoid inaccuracies that might arise if the process is fully automated.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of volume dimensioning generally described above. It will be understood by those skilled in the art that, although the embodiments described above and shown in the figures are generally directed to the context of volume dimensioning, applications for determining other values related to objects, such as parcels and packages, may also benefit from the concepts described herein. Further, although the embodiments described above and shown in the figures are directed to volume dimensioning using a portable electronic device, the concepts and the embodiments described herein are equally applicable to non-portable devices or to a system having multiple standalone devices coupled to one.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of operating a dimensioning system including a computing system communicably coupled to a lease one input device, at least one output device, and at least one imager, the dimensioning system to determine dimensional information for objects, the method comprising:

Acquiring a number of images via the at least one imager;
computationally identifying representation of three-dimensional object in at least one of the acquired image;
automatically selecting by the computing system one object represented in the at least one of the acquired images as a candidate for processing;
providing an indication to a user indicative of the automatically selected object via the at least one output device;
receiving at least one user input device, the at least one user input indicative of at least one of a confirmation of the automatically selected object for processing or a selection of a different object present in the at least one of the acquired images for processing; and
computationally determining dimensional data for the object indicated by the received user input;
wherein computationally determining dimensional data for the object indicated by the received user input includes determining a dimensional data for the object by the received user input includes determining a dimensional weight based on an estimated perimeter of the object indicated by the received user selection as the object is represented in the acquired image.

2. The method of claim 1 wherein computationally determining dimensional data for the object indicated by the received user input includes determining a dimensional weight based on an estimated perimeter of the initially selected one object as represented in the acquired image.

3. The method of claim 1, further comprising:
providing an indication to the user indicative of a currently selected object, the indication visually distinguishing the currently selected object in a display of the acquired image from any other object represented in the display of the acquired image.

4. The method of claim 1 wherein receiving at least one user input indicative of an object selected for processing includes receiving a user selection that indicates at least a portion of a new perimeter for the object for processing.

5. The method of claim 4 wherein computationally determining dimensional data for the object indicated by the received user input includes computationally determining dimensional data based on the new perimeter of the object represented in the acquired image.

6. The method of claim 1 wherein providing an indication to a user indicative of the initially selected object includes displaying the acquired image and visually distinguishing the initially selected object in the display of the acquired image from any other objects represented in the display of the acquired image.

7. The method of claim 6 wherein visually distinguishing the initially selected object in the display of the acquired image from any other objects represented in the display of the acquired image includes displaying a border about at least a portion of the initially selected object in the display of the acquired image.

8. The method of claim 7 wherein receiving at least one user input indicative of an object selected for processing includes receiving at least one signal representing a position in the image that indicates a position of at least a portion of a new perimeter for the object for processing.

9. The method of claim 6 wherein visually distinguishing the initially selected object in the display of the acquired image from any other objects represented in the display of the acquired image includes displaying a draggable border about at least a portion of the initially selected object in the display of the acquired image.

10. The method of claim 9 wherein receiving at least one user input indicative of an object selected for processing includes receiving at least one signal representing a dragging of the draggable border to a new position that indicates at least a portion of a new perimeter for the object for processing.

11. The method of claim 1 wherein computationally determining dimensional data for the object indicated by the received user input includes computationally determining a dimension of at least one of a box, a package, a parcel, a pallet or a document represented in the acquired image.

12. A method of operating a dimensioning system including a computing system communicably coupled to at least one input device, at least one output device, and at least one imager, the dimensioning system to determine dimensional information for objects, the method comprising:
acquiring a number of images via the at least one imager;
computationally identifying representations of three-dimensional objects in at least one of the acquired images;
automatically selecting by the computing system one object represented in the at least one of the acquired images as a candidate for processing;
providing an indication to a user indicative of the automatically selected object via the at least one output device;
receiving at least one user input indicative of an object selected for processing, the at least one user input including an input that indicates at least a portion of a new perimeter of the three-dimensional representation of the automatically selected object for processing; and
computationally determining dimensional data for the object indicated by the received user input;
wherein computationally determining dimensional data for the object indicated by the received user input includes determining a dimensional data for the object by the received user input includes determining a dimensional weight based on an estimated perimeter of the object indicated by the received user selection as the object is represented in the acquired image.

13. The method of claim 12 wherein computationally determining dimensional data for the object indicated by the received user input includes computationally determining dimensional data based on the new perimeter of the object represented in the acquired image.

14. The method of claim 12 wherein providing an indication to a user indicative of the initially selected object includes displaying the acquired image and visually distinguishing the initially selected object in the display of the acquired image from any other objects represented in the display of the acquired image.

15. The method of claim 14 wherein visually distinguishing the initially selected object in the display of the acquired image from any other objects represented in the display of the acquired image includes displaying a border about at least a portion of the initially selected object in the display of the acquired image.

16. The method of claim 14 wherein visually distinguishing the initially selected object in the display of the acquired image from any other objects represented in the display of the acquired image includes displaying a draggable border about at least a portion of the initially selected object in the display of the acquired image.

17. The method of claim 16 wherein receiving at least one user input indicative of an object selected for processing includes receiving at least one signal representing a dragging of the draggable border to a new position that indicates at least a portion of a new perimeter for the object for processing.

* * * * *